(12) United States Patent
Xuefeng et al.

(10) Patent No.: US 10,705,886 B2
(45) Date of Patent: Jul. 7, 2020

(54) SYNCHRONIZATION OF HARDWARE UNITS IN DATA PROCESSING SYSTEMS

(71) Applicant: Arm Limited, Cambridge (GB)

(72) Inventors: Pan Xuefeng, Shanghai (CN); Yin Jianfeng, Shanghai (CN)

(73) Assignee: Arm Limited, Cambridge (GB)

(*) Notice: Subject to any disclaimer, the term of this patent is extended or adjusted under 35 U.S.C. 154(b) by 67 days.

(21) Appl. No.: 16/033,985

(22) Filed: Jul. 12, 2018

(65) Prior Publication Data
US 2019/0377613 A1 Dec. 12, 2019

(30) Foreign Application Priority Data

Jun. 11, 2018 (CN) .......................... 2018 1 0593687

(51) Int. Cl.
*G06F 9/54* (2006.01)
*G06F 9/52* (2006.01)
*G06F 9/445* (2018.01)

(52) U.S. Cl.
CPC ................ *G06F 9/52* (2013.01); *G06F 9/445* (2013.01); *G06F 9/544* (2013.01)

(58) Field of Classification Search
CPC .................................. G06F 9/544; G06F 9/546
USPC .................................................. 719/312, 313
See application file for complete search history.

(56) References Cited

U.S. PATENT DOCUMENTS 6,629,152 B2 * 9/2003 Kingsbury .............. G06F 9/544
 719/313
8,082,426 B2 * 12/2011 Paltashev ............ G06F 9/30087
 712/228

* cited by examiner

*Primary Examiner* — Andy Ho
(74) *Attorney, Agent, or Firm* — Vierra Magen Marcus LLP

(57) ABSTRACT

A data processing system includes one or more producer processing units operable to produce data outputs, and one or more consumer processing units operable to use a data output produced by a producer processing unit, and a synchronization unit that is operable to communicate with the one or more producer processing units and the one or more consumer processing units, so as to synchronize the production and use of data outputs by the producer and consumer processing units.

23 Claims, 7 Drawing Sheets

SYNCHRONIZATION OF HARDWARE UNITS IN DATA PROCESSING SYSTEMS

BACKGROUND

The technology described herein relates to data processing systems, and in particular to the synchronization of the operation of hardware units in data processing systems.

In a data processing system, a "producer" processing unit may produce (generate) a data output that is then to be used (e.g. processed) by one or more other "consumer" processing units of the data processing system. An example of this would be in a multimedia subsystem where, for example, a video decoder may decode encoded video data representing a sequence of video frames to be displayed, with one or more other processing units, such as a graphics processing unit, then processing the decoded video frames in a desired manner, before those video frames are provided to a display for display.

FIG. 1 shows schematically an exemplary data processing system which includes a multimedia subsystem. As shown in FIG. 1, the data processing system 200 comprises a multimedia subsystem in the form of a system-on-chip (SOC) 202. The system generally also comprises off-chip (main) memory 216, a display device 218 and a video camera 220.

The multimedia subsystem SOC 202 comprises a central processing unit (CPU) 204, a graphics processing unit (GPU) 206, a video processor 208, a display controller (display processor) 210, an interconnect 212 and a memory controller 214.

As shown in FIG. 1, the CPU 204, GPU 206, video processor 208, and display controller 210 communicate with each other via the interconnect 212 and with the memory 216 via the interconnect 212 and the memory controller 214. The display controller 210 also communicates with the display device 218. The video camera 220 also communicates with the multimedia system SOC 202 via the interconnect 212.

In a data processing system as shown in FIG. 1, the video processor 208 may, for example, be operable to decode encoded video data that has been stored in the memory 216, and to then store the decoded video data in the memory 216 for subsequent processing by, for example, the GPU 206. The GPU 206 may correspondingly store the processed video data in the memory 216 for use then by the display controller 210 for providing to the display device 218 for display. In this case therefore, the video processor 208 will be acting as a producer processing unit producing, e.g., frames of decoded video data for consumption by the GPU 206, with the GPU 206 correspondingly acting as a producer processing unit to provide processed video frames for consumption (use) by the display controller 210.

In arrangements such as that illustrated in FIG. 1, a "producer" processing unit will typically store the data that it is producing in an appropriate memory that is shared with (also accessible to) the consumer processing units that are to use the data, with the consumer processing units then reading the data from the memory for use.

An important aspect of such operation is to synchronize the reading of the data from the memory by the consumer processing units with the writing of the data to the memory by the producer processing unit. For example, the consumer processing units must be controlled to avoid trying to read data from memory before the data is stored in the memory by the producer processing unit.

The synchronization of such operation may be provided by use of software "fences" to synchronize the operation of the different processing units. Such software fences are usually controlled by, and operate under the control of, respective drivers for the processing units (that are running on a central processing unit of the overall data processing system).

For example, in the case of a multimedia subsystem as discussed above in relation to FIG. 1, when the video processor 208 finishes its decoding of a video frame and has stored the decoded video frame in the memory 216, it may signal an interrupt to the video processor driver executing on the CPU 204, with the video processor driver recognising that interrupt as indicating that the production of the video frame has been completed, and accordingly communicating that event to the driver of the consumer processing unit (e.g. for the GPU 206) that is to use the decoded video frame. The driver for the, e.g. GPU 206, will receive that message and then trigger the, e.g. GPU 206, to process (use) the decoded video frame that is now present in the memory 216.

Correspondingly, once the GPU 206 has finished processing the decoded video frame and stored the decoded video frame in memory, it will correspondingly signal an interrupt indicating that the complete frame has been rendered to the GPU driver on the CPU 204, with the GPU driver then recognising that event and correspondingly signalling (e.g.) the driver for the display controller (display processor) 210 to cause the display controller driver to then trigger the display controller 210 to process the rendered frame from the GPU 206 for display.

FIGS. 2 and 3 illustrate this operation.

FIG. 2 shows an exemplary multimedia subsystem stack corresponding to the data processing system and multimedia subsystem of FIG. 1.

As shown in FIG. 2, an application 30 executing, e.g., on the CPU 204 of the multimedia subsystem 202 will interact via appropriate APIs 32 and corresponding drivers 33 for the hardware units 31 with the appropriate multimedia subsystem hardware 31 (comprising, e.g., the graphics processing unit 206, the video processor 208, the display processor 210 and the memory 216). As discussed above, as part of this operation, the communication and control of the hardware processing units 31 will be synchronized by means of software "fences" 34 that are enforced and implemented by the respective drivers 33 for the hardware units 31.

FIG. 3 illustrates this for the case of the graphics processor 206 drawing a frame that will then be used by the display processor 210 to display the frame on the display device 218.

As shown in FIG. 3, this operation will first comprise, after system boot up, initialisation of the graphics processor 206 (step 40), and correspondingly initialisation of the display processor 41 (step 41). The driver 35 for the graphics processor 206 will then prepare the appropriate commands and data for causing the graphics processor to draw the desired frame (step 42). As part of this operation, the GPU driver 35 will set a "fence" to identify and signal the completion of the frame (step 43).

Correspondingly, the display processor driver 36 will prepare the appropriate buffers 37 and wait on the "fence" generated by the GPU driver 35 (the display processor driver won't send the command to the display processor hardware until the waiting "fence" is signalled). The display processor driver may also set its own "fence" for synchronization if using the same buffer.

The graphics processor driver 35 will then issue the appropriate commands and data to the graphics processor hardware 206 which will then draw the frame (step 46) and write the frame into the appropriate buffer 47 in memory.

When the graphics processor hardware 206 finishes drawing the frame, it will signal an interrupt to the graphics processor driver (step 48). The graphics processor driver will accordingly signal that the "completion" fence has occurred (step 49) to the Android synchronization service (step 50) (which controls the synchronization "fences") which will then signal that the graphics processor hardware fence has been completed (step 51).

It will correspondingly be signalled to the display processor driver 36 that the graphics processor completion fence has been signalled, and in response to that, the display processor driver 36 will trigger the display processor hardware 210 to read the completed frame from the buffer 47 and display it on the display (steps 52 and 53).

Arrangements of the type illustrated in FIGS. 1, 2 and 3 typically have relatively long latencies. For example, in the multimedia subsystem example described above, the display (consumer) processing unit will only access the completed data output from the graphics (producer) processing unit once the entire output (e.g. frame) has been completed. This will then lead to a latency of one or more frames (depending upon how many producing and consuming units are in the overall processing pipeline) between the initial generation of the, e.g. frame, and its display.

Such latency can be a problem, particularly in the case of lower powered, and mobile, devices. For example, longer latencies can reduce the user experience, especially in gaming and virtual reality (VR) use cases.

The Applicants accordingly believe that there remains scope for improved synchronization and handling of data outputs that are being shared between producing and consuming processing units in data processing systems.

BRIEF DESCRIPTION OF THE DRAWINGS

Various embodiments of the technology described herein will now be described by way of example only and with reference to the accompanying drawings, in which.

Like reference numerals are used for like features in the drawings (where appropriate).

DETAILED DESCRIPTION

Figure 1:
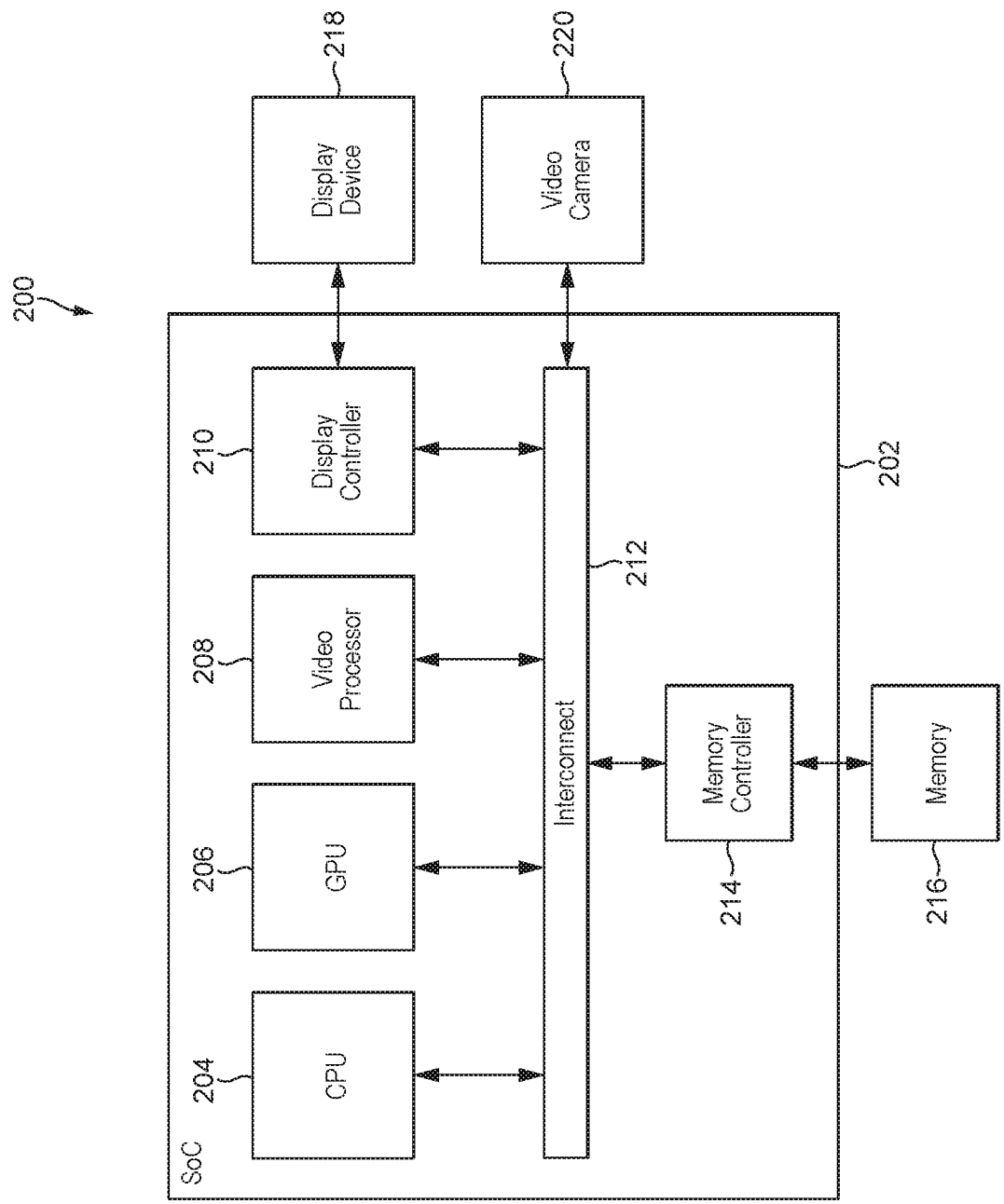
FIG. 1 shows an exemplary data processing system.

A first embodiment of the technology described herein comprises a data processing system comprising:
  one or more producer processing units operable to produce data outputs;
  one or more consumer processing units operable to use a data output produced by a producer processing unit; and
  a memory for storing data outputs produced by the producer processing unit or units;

wherein:
  the one or more producer processing units each comprise processing circuitry operable to produce a data output and store the data output in the memory; and
  the one or more consumer processing units each comprise processing circuitry operable to read a data output from the memory and use the read data output;
  the data processing system further comprising:
  a synchronization unit that is operable to communicate with the one or more producer processing units and the one or more consumer processing units, and that is operable to:
    maintain a record of data outputs that are being generated by producer processing units of the data processing system;
    receive from producer processing units of the data processing system messages relating to the progress that a producer processing unit has made when producing a data output; and
    and to, in response to a message relating to the progress that a producer processing unit has made when producing a data output received from a producer processing unit:
    send to one or more consumer processing units of the data processing system a message relating to the progress that a producer processing unit has made when producing a data output;
wherein:
  the one or more producer processing units each further comprise processing circuitry operable to send to the synchronization unit messages relating to the progress that the producer processing unit has made when producing a data output; and
  the one or more consumer processing units each further comprise processing circuitry operable to:
  receive data output progress messages from the synchronization unit and to control the reading of a data output from the memory in accordance with data output progress messages received from the synchronization unit.

A second embodiment of the technology described herein comprises a method of operating a data processing system that comprises:
  one or more producer processing units operable to produce data outputs;
  one or more consumer processing units operable to use a data output produced by a producer processing unit;
  a memory for storing data outputs produced by the producer processing unit or units; and
  a synchronization unit that is operable to communicate with the one or more producer processing units and the one or more consumer processing units;
  the method comprising:
  a producer processing unit of the one or more producer processing units producing a data output and storing the data output in the memory; and
  one or more of the one or more consumer processing units reading the data output from the memory and using the read data output;
  the method further comprising:
    the synchronization unit maintaining a record of the data output that is being generated by the producer processing unit;
    the producer processing unit that is producing the data output sending to the synchronization unit a message relating to the progress that the producer processing unit has made when producing the data output;
    the synchronization unit receiving from the producer processing unit the message relating to the progress that the producer processing unit has made when producing the data output, and, in response to the message relating to the progress that the producer processing unit has made when producing the data output from the producer processing unit, sending to one or more consumer processing units of the data processing system, a message relating to the progress that the producer processing unit has made when producing the data output;
and
one or more of the consumer processing units receiving the data output progress message from the synchronization unit and controlling their reading of the data output from the memory in accordance with the data output progress message received from the synchronization unit.

The technology described herein relates to situations in which a producer processing unit of a data processing system is producing a data output that is to be used by one or more other consumer processing units of the data processing system.

In the technology described herein, a synchronization unit is provided that maintains a record of data outputs that are being produced by producer processing units of the data processing system. Producer processing units update the synchronisation unit with their progress when producing a data output, and the synchronization unit then signals the progress update to the consumer processing units of the data processing system, so that they can then use that progress information to control their reading of the data outputs from the memory (e.g. to determine whether and when there is data available for them to read).

Thus the technology described herein, as will be discussed further below, uses a hardware unit (the synchronization unit), to control synchronization of the producing and consuming units in the data processing system, with the producing and consuming processing units being synchronized by (hardware) signals to and from the synchronization unit (rather than a software "fence").

As will be discussed further below, this can be used to significantly reduce the latency between producing and consuming hardware units as compared to, for example, arrangements in which software "fences" are used. For example, and as will be discussed further below, the technology described herein can facilitate synchronizing the operation of producer and consumer processing units at fractions of a given data output that is being produced, rather than, e.g., a consumer processing unit having to wait until the producer processing unit has produced the entire output (e.g. frame) before the consumer processing unit can start using that output. It can also facilitate more flexible control of the rate of synchronization (the intervals at which synchronization is triggered) between producer and consumer processing units.

The technology described herein can be used in any desired and suitable data processing system in which a "producing" processing unit will generate and store data outputs for use by one or more "consuming" processing units. Examples of data processing systems to which the technology described herein is particularly applicable include video processing systems, image processing systems, and graphic processing systems.

A (and each) producer processing unit correspondingly can be any suitable and desired processing unit of a data processing system that may produce a data output for use by one or more other processing units of a data processing system. In an embodiment, a producer processing unit is one of a video processor (e.g. a video encoder and/or a video decoder), a graphics processor, an image processor, a digital signal processor (DSP), and a central processing unit of the data processing system.

There may only be one producer processing unit in the data processing system. However, in an embodiment, there are plural producer processing units. The plural producer processing units may comprise, for example, one or more of, and in an embodiment plural of, and in an embodiment all of, a video processor, a graphics processor, an image processor, a digital signal processor, and a central processing unit (CPU).

Thus, in an embodiment, the data processing system comprises plural producer processing units, each of which operates in the manner of the technology described herein.

Each producer processing unit in an embodiment has an associated producer processing unit identifier that identifies the producer processing unit (and that in an embodiment uniquely identifies the producer processing unit in the overall set of producer processing units that are in the data processing system (and that are operable in the manner of the technology described herein to interact with the synchronization unit)).

The technology described herein can be used for all forms of data outputs that a processing unit of a data processing system may provide and/or use. Thus, the data output that is being produced by a producer processing unit can comprise any suitable and desired data output that may be used by other processing units of the data processing system. This may depend, for example, upon the nature of the producer processing unit.

The data output may, for example, and in an embodiment does, represent an array of data elements, such as an image or frame, e.g. for display. Thus, the data output that is being produced may comprise image data, and/or may correspond to one or more images or frames of image data (and in an embodiment, this is the case). In an embodiment, the data output comprises an image or frame generated by a video processor, a graphics processor or an image processor.

A (and each) consumer processing unit can correspondingly be any suitable and desired processing unit of a data processing system that may use a data output produced by a processing unit of the data processing system.

In an embodiment, a consumer processing unit is one of a video processor, a graphics processor, an image processor, a digital signal processor (DSP), a display processor (controller), and a central processing unit of the data processing system.

There may only be a single consumer processing unit, but in an embodiment the data processing system includes plural consumer processing units. The plural consumer processing units may comprise, for example, one or more of, and in an embodiment plural of, and in an embodiment all of, a video processor, a graphics processor, an image processor, a digital signal processor, a display processor (controller), and a central processing unit (CPU).

Where the data processing system includes plural consumer processing units, then each consumer processing unit is in an embodiment operable in the manner of the technology described herein.

Each consumer processing unit in an embodiment has an associated consumer processing unit identifier that identifies the consumer processing unit (and that in an embodiment uniquely identifies the consumer processing unit in the overall set of consumer processing units that are in the data processing system (and that are operable in the manner of the technology described herein to interact with the synchronization unit)).

A consumer processing unit may use a data output that is being produced by a producer processing unit in any suitable and desired manner. This may depend, for example, upon the nature of the consumer processing unit and/or of the data output in question (e.g. as discussed above).

In one embodiment, the consumer processing unit is a graphics processing unit and performs graphics processing on the data output that it is consuming. In another embodiment, the consumer processing unit is a display controller, and performs display processing so as to display the data output that it is consuming on a display.

There may be only one consumer processing unit that is using a data output, but in an embodiment there can be, and is in an embodiment, more than one (plural) consumer processing units using the (same) data output. Where plural consumer processing units are reading and using the same data output, each of the consumer processing units in an embodiment operates (independently of the other consumer processing units) in the manner of the technology described herein.

Correspondingly, in an embodiment, a given consumer processing unit can consume (use) plural data outputs at the same time, e.g. produced by the same or different producer processing units.

It would also be possible for a given data output to, in effect, be produced and consumed (used) by a sequence of processing units, each operating in the manner of the technology described herein. In this case therefore, a first producer processing unit in a sequence of processing units would produce a data output which would then be used by a consumer processing unit with that consumer processing unit then producing a data output (e.g. a modified version of the initial data output) for use by another consumer processing unit of the data processing system (and so on, if desired). For example, a video processor could produce a decoded video frame (or sequence of video frames) which are then processed by a graphics processor to produce a modified video frame (or a sequence of modified video frames), with the modified video frame or frames then being used by a display controller to provide the modified video frame or frames to a display for display.

It would also be possible for a processing unit to act both as a producer processing unit and as a consumer processing unit, if desired. In this case, the processing unit could act solely as either a producer processing unit or a consumer processing unit at any given time, or it could be the case that the processing unit is acting as both a producer processing unit for one or more data outputs, and as a consumer processing unit for one or more (e.g. other) data outputs, at the same time (simultaneously) if desired. In this case, the processing unit in an embodiment acts appropriately in the manner of the technology described herein for each data output that it is actively handling.

Correspondingly, a consumer processing unit (or one of the consumer processing units) may be the same unit as a (and the) producer processing unit, if desired. Thus, there may be a processing unit that is acting as both the producer and the or a consumer for a data output.

In an embodiment, the operation in the manner of the technology described herein is performed for plural data outputs that are being produced and used at the same time. In this case, the different data outputs could be being produced by different producer processing units, or a given producer processing unit may be producing plural data outputs at the same time (e.g. in the case where the producer processing unit can support plural active data channels at any given time), or a combination of the two.

The memory in which the data outputs are stored (and from which the data outputs are read) may be any desired and suitable memory of or for the data processing system, such as, and in an embodiment, a main memory for the processing units in question (e.g. where there is a separate memory system for the processing units in question), and/or a main memory of the data processing system that is shared with other elements, such as a host processor (CPU) of the data processing system.

The memory may be external to the processing units in question. In an embodiment, the memory is an external DRAM.

A producer processing unit can store its data output in the memory in any suitable and desired manner. This may, e.g., depend upon the nature of the data processing system and the producer processing unit in question.

In an embodiment, a (and each) producer processing unit is operable to store its data output in an allocated region of the memory (in a memory "buffer" assigned for the purposes of storing the data output in question). A (and each) consumer processing unit that is to use the data output will then read the data output from the corresponding memory region (buffer). To facilitate this, the producer and consumer processing units will accordingly be provided with the identity and/or location in the memory of the memory buffer that is to be used for the data output in question.

Other arrangements would, of course, be possible.

The synchronization unit of the technology described herein that is operable to communicate with the producer processing units and the consumer processing units can comprise any suitable and desired hardware unit that includes appropriate processing circuitry for operation in the manner of the technology described herein. Thus the synchronization unit should, and in an embodiment does, comprise appropriate processing circuitry for communicating with the one or more producer processing units and with the one or more consumer processing units in the manner required, and appropriate processing circuitry for maintaining the record of data outputs that are being generated, etc., that the synchronization unit is to maintain.

The synchronization unit will communicate with the producer processing units and the consumer processing units and synchronize the production and use of data outputs in hardware, without any software involvement (i.e., inter alia, without the need for any synchronization signals or messages to be processed in software) (once the processing of and for a data output has been triggered by the sending of the appropriate command or commands to the relevant hardware processing units). Accordingly, the synchronization unit will be and is operable to synchronize the operation of the producer and consumer processing units automatically and completely in hardware, without any software involvement. Correspondingly, there will be no software involvement once the processing of a data output is started.

Thus, for example, the various progress update (synchronization) messages of the technology described herein that are exchanged between the synchronization unit and the producer and consumer processing units are sent, received and processed via hardware communication paths and in hardware without requiring (and without there being) any software processing of those messages.

The synchronization unit maintains a record of data outputs that are being generated by producer processing units of the data processing system. This record can take any suitable and desired form. It could comprise a record of a single data output, but in an embodiment, the synchronization unit maintains a record of and for plural data outputs that are being generated by producer processing units of the data processing system.

In an embodiment the record of data outputs takes the form of a set of plural record entries ("slots"), each of which has a respective, and in an embodiment unique within the set of entries, entry (slot) identifier.

Each entry (slot) in the record of data outputs can in an embodiment (and in an embodiment does) have associated with it an identifier for the producer processing unit that the entry (slot) has been allocated to (when allocated to a producer processing unit).

In an embodiment, the record of data outputs that have been generated by producer processing units of the data processing system that is maintained by the synchronization unit includes for a, and in an embodiment for each, data output for which the record is being maintained, an indication of the progress that the producer processing unit has made with producing the data output in question. Thus, in an embodiment, each entry (slot) in the record of data outputs in an embodiment can (and in an embodiment does) have associated with it an indication of the progress that the producer processing unit (that the data entry (slot) has been allocated to) has made with producing a (and its) data output.

Accordingly, in an embodiment, the record of data outputs comprises a set of plural data output record entries (slots), each of which has a respective entry (slot) identifier, a respective producer processing unit identifier, and a respective progress indication (and in an embodiment only these parameters), associated with it.

Thus, where plural data outputs are being produced and used, then a given (and each) data output will have its own progress record that is associated with that data output and that is maintained and used in the manner of the technology described herein.

The data output progress indication, e.g., and in an embodiment, that is associated with a data output record entry (slot), can take any suitable and desired form.

In an embodiment, the progress indication is an indication of how far the producer processing unit has progressed with producing a data output (and storing it in the memory). The progress indication could indicate an actual position in a data output that has been written but in an embodiment indicates a (relative) position in a data output that the producer processing unit has reached, e.g. relative to a particular, in an embodiment selected, in an embodiment predetermined, position in a data output, such as, and in an embodiment, relative to the start of a or the data output.

The progress indication is in an embodiment in the form of a count value. This could be, e.g., a count of the number of particular data units (e.g. of respective sets of scan lines) in the data output in question that the producer processing unit has produced and stored to the memory.

In an embodiment, the progress indication is in the form of a count of the number of progress "update" messages that the producer processing unit in question has sent to the synchronization unit (e.g., and in an embodiment, since initialisation (start-up)).

As will be discussed further below, in an embodiment the producer processing units are configured to send progress update messages to the synchronization unit at intervals, e.g., and in an embodiment, when particular portions (fractions) of a data output have been produced and stored in the memory. The progress indication that is maintained by the synchronization unit for a data output in an embodiment then comprises a count of those update messages that have been received from the producer processing unit.

In this case, the progress indication will accordingly correspondingly comprise (and act as) a count of particular data "portions" of a data output that have been produced and stored to memory by a producer processing unit. Such data portions could comprise any suitable and desired amount of data that can be measured and counted for a data output, such as, and in an embodiment, some identifiable and regular amount of data that will be produced by the producer processing unit when producing the data output in question. In an embodiment, the data portions that are counted comprise respective sets of scan lines of the data output that is being produced (e.g. in case where the data output is an array of data such as an image, such as a frame). Other arrangements would, of course, be possible.

A new count (e.g., and in an embodiment, of progress update messages (data portions)) could be started each time the producer processing unit in question begins a new data output. However, in an embodiment, the count (for a given record entry (slot)) is simply a cumulative count, e.g., and in an embodiment, of the number of progress update messages that the producer processing unit has sent to the synchronization unit (e.g., and in an embodiment, after initialisation), and so is in an embodiment not reset each time a new data output is started.

In this case therefore, for the first data output that a producer processing unit produces after having connected to the synchronization unit, the progress indication (progress update message count) will be set, e.g. to zero, and that counter value will then be increased for each progress update message that the producer processing unit sends when producing the data output, but when a new data output is to be produced and recorded using that producer processing unit data output record entry, the initial value of the progress indication (update count) will not be reset, but will be the value that was reached at the end of the previous data output.

Other arrangements would, of course, be possible.

As well as maintaining a record of the data outputs being produced by producer processing units, in an embodiment the synchronization unit also maintains a record of the consumer processing units of the data processing system. This can also take any suitable and desired form, but in an embodiment comprises (and in an embodiment comprises only) a list of consumer processing units (at least that have "registered" with the synchronization unit), in an embodiment in the form of (a list of) identifiers that identify the respective consumer processing units. This list in an embodiment lists plural consumer processing units.

The record of data outputs that have been generated by producer processing units (and the record of consumer processing units (where maintained)) can be stored in any suitable and desired storage of or accessible to the synchronization unit. In an embodiment, these records are maintained in storage that is local to the synchronization unit, such as in a cache or caches of or accessible to the synchronization unit.

The record of consumer processing units (when maintained) is in an embodiment stored inside of the synchronization unit. It could, e.g., be configured (hard-coded) at system build, or a more flexible arrangement that uses a configuration file which the synchronization unit driver then reads at system boot-up to initialise the consumer processing unit record could be used if desired. It would also be possible to allow consumer processing units (e.g. their drivers) to call the synchronization unit (e.g. its driver) to update the consumer processing unit record, if desired.

Thus, the synchronization unit in an embodiment comprises and/or has access to local storage, in which it stores the data output record, etc., that it is maintaining.

In an embodiment, the synchronization unit includes a controller (control circuitry) that is operable to interact (communicate) with the producer and consumer units of the data processing system (e.g., and in an embodiment, to exchange messages with those units) (at least that are actively "connected" to and, in an embodiment, "registered" with the synchronization unit), and to maintain and update the information in the record of the data outputs being produced by the producer processing units and the record of the consumer processing units (when present) (e.g., and in an embodiment, inter alia, in response to messages received from producer and/or consumer processing units).

In an embodiment, the synchronization unit is driven by a driver for the synchronization unit that, e.g., and in an embodiment, executes on a CPU (e.g. host processor) of the data processing system. The synchronization unit driver is in an embodiment operable to (and operates to) configure the synchronization unit hardware for initialisation and synchronization, and to interface with drivers for other hardware units (the producing and consuming processing units) of the data processing system for operation with those units.

The driver for the synchronization unit is in an embodiment loaded during system boot-up, and before any "connection" of the synchronization unit with other processing units for operation with those units (thus the synchronization unit driver is in an embodiment loaded before the driver of any other processing unit that will be "connected" to the synchronization unit).

In an embodiment, producer, and, optionally, consumer, processing units of the data processing system are operable to (and operate to) "register" with the synchronization unit, before their operation is synchronized using the synchronization unit. This is in an embodiment done when initialising the data processing system for operation (e.g. at switch on/boot-up).

In an embodiment, such registration of the processing units with the synchronization unit is performed by appropriate exchange of messages between and for the processing units and the synchronization unit. This is in an embodiment done by means of appropriate exchange of messages between respective drivers for the processing unit or units and a driver for the synchronization unit. For example, and in an embodiment, a driver for a producer or consumer processing unit could register with the synchronization unit by sending an appropriate API call to the synchronization unit driver (e.g., and in an embodiment, during initialisation of the producer or consumer processing unit).

Thus in an embodiment, a consumer processing unit is (and the consumer processing units are) operable to (and in an embodiment operates to) register itself with the synchronization unit (and accordingly to indicate to the synchronization unit that it should be added to the consumer processing unit list in the synchronization unit), e.g., and in an embodiment, during its initialisation.

To facilitate this operation, a consumer processing unit (e.g., and in an embodiment, the driver for the consumer processing unit) can in an embodiment send to the synchronization unit (e.g., and in an embodiment, to the driver for the synchronization unit) a "connect" message to "register" the consumer processing unit with the synchronization unit (so as to "connect" to the synchronization unit for synchronization purposes). This message in an embodiment indicates an identifier for the processing unit in question (which will accordingly and in an embodiment be recorded in the consumer processing unit record maintained by the synchronization unit).

Correspondingly, a producer processing unit is in an embodiment operable to request one or more entries (slots) in the record of data outputs being produced by producer processing units that is maintained by the synchronization unit, in an embodiment during the initialisation of the producer processing unit.

A producer processing unit may request a single or plural entries in the producer processing unit record from the synchronization unit, e.g., and in an embodiment, depending upon how many data outputs the producer processing unit can and/or is likely to and/or wishes to produce (at the same time). The driver for the producer processing unit could, e.g., determine how many entries will be required.

To facilitate this operation, a producer processing unit (e.g., and in an embodiment, the driver for the producer processing unit) can in an embodiment send to the synchronization unit (e.g., and in an embodiment, to the driver for the synchronization unit) a "connect" message to request a producer processing unit data output record entry (slot) from the synchronization unit (so as to "connect" to the synchronization unit for synchronization purposes). This message in an embodiment indicates an identifier for the processing unit in question (which will accordingly and in an embodiment be recorded against the producer processing unit data output record entry in the synchronization unit).

In response to such a message, the synchronization unit (e.g., and in an embodiment, its driver) in an embodiment returns a message that either indicates the entry (slot) that has been allocated to the producer processing unit (e.g., and in an embodiment, in the form of an identifier for the allocated record entry (the entry (slot) ID), or a message (e.g. a particular, in an embodiment predefined, "default" value) that indicates that no entries (slots) in the synchronization unit are available (i.e. the producer processing unit cannot connect to the synchronization unit for synchronization for its data output).

In an embodiment, in response to such a registration request, the synchronization unit (e.g. in an embodiment its driver) first determines whether there is an available entry (slot) in the producer processing unit data output record (e.g. checks the usage status for each entry (slot)), and when it finds a free entry (slot), allocates that entry (slot) to the producer processing unit in question and sets the producer processing unit identifier for the entry (slot) in question to the identity of the requesting producer processing unit, and then returns the relevant entry (slot) identity to the producer processing unit (e.g. its driver), so that the producer processing unit knows which producer processing unit record entry (slot) it has been allocated and is to use.

In the case where each producer processing unit data output record entry that is maintained by the synchronization unit has associated with it a data output progress indication, then in an embodiment, the synchronization unit also sets the progress indication for the allocated entry (slot) to a particular, in an embodiment selected, in an embodiment predetermined, initialisation value, such as, and in an embodiment, zero.

Thus, in an embodiment, the method of the technology described herein comprises (and the producer processing unit or units and the synchronization unit are operable to): a producer processing unit first requesting from the synchronization unit an allocation of an entry or entries in the producer processing unit data output record that is maintained by the synchronization unit, and in response to such a request, the synchronization unit allocating an entry or entries in the producer processing unit data output record maintained by the synchronization unit to the requesting producer processing unit. In an embodiment, the synchronization unit first checks whether there is an available entry in the producer processing unit data output record before allocating an entry to a producer processing unit. As part of this process, the synchronization unit in an embodiment informs the producer processing unit of the identity of the entry in the producer processing unit data output record that it has been allocated.

In an embodiment, the synchronization unit can maintain as many producer processing unit data output record entries (slots) as is ever likely to be required by producer processing units of the data processing system (since the overhead for maintaining the record of producer processing unit data outputs is relatively low).

Correspondingly, in an embodiment a producer processing unit can (and does) retain its allocated entry or entries (slots) in the producer processing unit data output record maintained by the synchronization unit (i.e. remains "connected" to the synchronization unit) continuously until such time as the data processing system is, e.g., shut down or ceases its current operation.

However, it would also be possible to have arrangements where there is a more limited set of entries for the producer processing units data output records, such that, e.g., it may be necessary to add and remove producer processing units (and/or data outputs) from the list in use. This could be achieved, e.g., by providing appropriate messaging arrangements for this purpose.

For example, it would be possible to allow processing units to also exchange "disconnect" messages with the synchronization unit so as to, e.g., allow processing units to be "disconnected" from the synchronization unit in use (and to, e.g., accordingly release producer processing unit data output record entries for use by other producer processing units). In this case, a processing unit could, e.g., send a "disconnect" message that identifies the processing unit that wishes to disconnect, with the synchronization unit then identifying any entries relating to that processing unit and releasing (clearing) those entries accordingly. The synchronization unit could also return a message to the processing unit that has requested "disconnection" indicating whether the disconnection has been successful or not (e.g. whether there was an error).

Once a producer processing unit has been registered with the synchronization unit and allocated an entry or entries in the synchronization unit's producer processing unit data output record, the producer processing unit can (and will) communicate with the synchronization unit so as to facilitate synchronization with consumer processing units that are using a data output that the producer processing unit is producing.

As discussed above, a producer processing unit that is producing a data output (and, e.g., and in an embodiment, that has "registered" with the synchronization unit) will, as it is producing the data output, send a message or messages to the synchronization unit relating to the progress that the producer processing unit has made when producing the data output. These messages will be sent by hardware communication (there is a direct hardware connection between the synchronization unit and all producers and consumers), such that no software is involved in the synchronization message sending and receiving.

The progress update messages relating to the progress that a producer processing unit has made when producing a data output can take any suitable and desired form.

In an embodiment, a (and each) progress update message at least identifies the producer processing unit in question, e.g., and in an embodiment, by including the identifier for the producer processing unit in question.

In an embodiment, a (and each) progress update message also identifies the producer processing unit data output record entry (slot) that the message relates to (i.e. the particular data output in the record that the synchronization unit is maintaining that the progress update message relates to), e.g., and in an embodiment, by including an identifier for the data output record entry (slot) in question in the progress update message.

In the case where the data output record maintained by the synchronization unit also includes for each data output a progress indication (as discussed above), then a (and each) progress update message sent by a producer processing unit when producing a data output in an embodiment also includes a progress indication (e.g., and in an embodiment, an appropriate counter value), indicating the progress that the producer processing unit has made when producing the data output.

Thus, in an embodiment the progress update messages sent by the producer processing units include (and in an embodiment only include): an indication of the identity of the producer processing unit in question, an indication of the identity of the producer processing unit record entry (slot) for the data output in question, and an updated progress indication (e.g. updated counter value).

Correspondingly, in an embodiment a (and each) producer processing unit maintains a data output progress record, e.g. count, e.g. and in an embodiment in terms of the number of progress update messages that it has sent (e.g. either for the data output in question or overall (e.g. since initialisation), as discussed above), for a (and, separately, for each) respective synchronization unit data output record entry that it has been allocated (that the synchronization unit is tracking), and, in an embodiment, periodically, e.g. when it is to send a new progress update message to the synchronization unit, updates (e.g. increments) that progress record (e.g. counter), and includes the updated (incremented) progress record (e.g. counter) value in the progress update message that it sends to the synchronization unit.

A producer processing unit could simply send a single progress update message to the synchronization unit for a (given) data output, for example when it has finished producing (and storing) the data output in question. However, in an embodiment, a producer processing unit is able to (and in an embodiment does) send progress updates during its production of a data output (whilst it is producing a data output), and not only when it has finished producing a given data output. In this case therefore, the producer processing unit will (and in an embodiment does) send progress update messages to the synchronization units at intervals (and periodically) while it is producing a data output. In other words, the producer processing unit will send update messages after it has produced respective portions (fractions) of the data output, and not only when it has completed the data output in question.

In this case therefore, a producer processing unit will send a plurality of progress updates, e.g., and in an embodiment at, in an embodiment regular, intervals when generating a data output. The intervals are in an embodiment measured in terms of the amount (fraction) of the data output that has been produced (rather than in terms of time, for example).

The number of progress updates to provide when generating a data output (the rate at which data output progress updates are sent to the synchronization unit by a producer processing unit when generating a data output) can be selected and set as desired. The number of updates may be fixed, e.g., for a producer processing unit and/or for the data processing system as a whole, but in an embodiment the number of progress updates to be provided for a, and per, data output can be configured and set in use. In an embodiment, the number of progress updates to be provided for a data output is determined and set by the driver for the producer processing unit in question.

The number of progress updates to be provided for a data output will, as will be discussed further below, set the granularity (rate) at which the operation of the producer and consumer processing units is synchronized for a data output, and can be selected based on any suitable and desired criterion. In an embodiment, this is based, at least in part, on the processing rates of the different processing units (the producing and consuming units), e.g., and in an embodiment, so as to try to maximise the utilisation of the processing units when processing a given data output. For example, if a processing unit is relatively slow, then the number of progress updates for a data output may be reduced (i.e. the progress update rate will be reduced) as compared to arrangements in which the processing units are able to process the data outputs relatively more quickly.

The number of progress updates could also, e.g., be based upon the processing that the data output is to undergo, and/or the way that the data output is generated. For example, where the processing that the data output is to undergo requires a particular amount (e.g. region) of the data output (e.g. where a filtering "window" is to be applied to the data output), it may be appropriate to have relatively fewer progress update points (i.e. to allow each progress update to relate to a (relatively) larger amount (e.g. region) of the data output in question).

Similarly, where the data output is processed on a sub-region-by-sub-region basis, such as, for example, may be the case for a tile-based graphics processing unit (GPU), then the progress updates could be configured and set to be performed after each sub-region, or after each set of a particular, in an embodiment selected, in an embodiment predefined, number of sub-regions, have been processed (e.g. produced).

Other arrangements would, of course, be possible.

The number of progress updates that will be provided when producing the data output are in an embodiment equally spaced across the data output, i.e. the overall data output is in an embodiment divided into as many (in an embodiment equal) partitions (fractions) as there will be progress updates provided when producing the data output, so as to divide the data output into a corresponding number of, in an embodiment equally sized, partitions, with a progress update then being provided after each such partition has been produced. Thus, for example, in the case of a frame that includes, e.g., 160 scan lines, and a progress update rate of 10 updates during the production of the frame, the producer processing unit will accordingly provide a synchronization update message to the progress unit every 16 scan lines.

The effect of this correspondingly is that the number of progress updates that will be provided will correspondingly define the size of the partition (fraction) of the data output that is generated between updates (with a greater number of updates resulting in progress updates being provided after smaller fractions of the data output have been generated and vice-versa). Accordingly, the number of progress updates may be, and in an embodiment is, set (selected) based on the size of the data output that it is desired to (and that will) be produced between successive progress updates. For example, this could be done so as to ensure that sufficient data of the data output is available to the consumer processing unit for the consumer processing unit to process the data output in the desired manner, before a progress update that will trigger the consumer processing unit to process more of the data output is sent.

When the synchronization unit receives a progress update message from a producer processing unit, in response to that message, it sends a message relating to the progress that the producer processing unit has made when producing the data output in question to one or more of the consumer processing units. These messages will again be sent by hardware communication (there is a direct hardware connection between the synchronization unit and all producers and consumers), such that no software is involved in the synchronization message sending and receiving.

As part of this operation, the synchronization unit in an embodiment first checks that any producer processing unit identifier included with the progress update message from the producer processing unit matches any recorded producer processing unit identifier for (associated with) the producer processing unit data output record entry (slot) in question in the data output record that is being maintained by the synchronization unit. If the identifiers match, then the synchronization unit registers the update message as being valid and in response thereto sends a progress update message to one or more of the consumer processing units. (On the other hand, if the producer processing unit identifiers for the progress update message and the indicated producer processing unit data output record entry (slot) do not match, then an error operation can be performed, for example to signal an error to the producer processing unit that sent the progress update message.)

In the case where the synchronization unit maintains a progress indication, such as a counter value, for each data output (for each producer processing unit data output record entry), then the synchronization unit in an embodiment also updates the progress indication (e.g., and in an embodiment, counter value) for the data output in question in response to receiving a progress update message from a producer processing unit (as well as sending a message relating to the progress that the producer processing unit has made when producing the data output in question to one or more of the consumer processing units).

In the case where the progress update message from the producer processing unit includes a progress indication (e.g. updated counter value), then the synchronization unit in an embodiment updates the progress indication (e.g. counter value) for the producer processing unit data output record entry in question on the basis of (e.g., and in an embodiment, to) the progress indication (e.g. counter value) included the progress update message from the producer processing unit.

The progress update message that is sent by the synchronization unit to the consumer processing unit or units in an embodiment indicates the data output that it relates to, in an embodiment by identifying the producer processing unit data output record entry (slot) that the progress update message relates to (e.g., and in an embodiment, by including the identifier for the record entry (slot) in question in the progress update message).

In the case where the synchronization unit maintains a progress indication, such as a counter value, for each data output (producer processing unit data output record entry), then the progress update messages sent by the synchronization unit to the consumer processing unit(s) in an embodiment also indicate (include) the new, updated progress (e.g., and in an embodiment counter) value that has been reached.

In an embodiment, such consumer progress update messages are broadcast to plural consumer processing units, and in an embodiment to all the consumer processing units in the consumer processing unit list that is maintained by the synchronization unit (if any), with each consumer processing unit then determining whether the progress update message is for a data output that it is processing (and waiting for) from the producer processing unit data output record entry (slot) identified in the progress update message from the synchronization unit (as will be discussed further below a consumer processing unit is in an embodiment made aware of the identity of the data output record entry (slot) that relates to the data output it is waiting on (processing), so that it can determine the consumer progress update messages that will apply to it).

Other arrangements, such as the synchronization unit being able to address its consumer progress update messages to specific consumer processing units would be possible if desired, although may require more sophisticated signalling and control operation.

A (and each) consumer processing unit can control the reading of a data output from the memory in accordance with data output progress messages received from the synchronization unit in any suitable and desired manner. In an embodiment, a consumer processing unit (and each consumer processing unit) uses the data output progress messages to determine when there is data for a data output available for it to read, and to, accordingly, trigger the reading of data of a data output from the memory for processing by the consumer processing unit.

In an embodiment a (and each) consumer processing unit uses the data output progress messages from the synchronization unit to (try to) ensure that it does not (try to) read data beyond the available data of the data output.

In an embodiment a consumer processing unit uses the data output progress messages from the synchronization unit to determine when it is safe to proceed with reading data for the data output from the memory (e.g., and in an embodiment, to determine when there is data stored in the memory for the data output such that, e.g., and in an embodiment, the consumer processing unit can read data for the data output from the memory).

Thus, when a consumer processing unit identifies from a consumer progress update message sent by the synchronization unit that a producer processing unit data output record entry that it was waiting on has been updated, the consumer processing unit in an embodiment correspondingly determines whether there is new data (e.g. a new data output partition) available for it to read for the data output (e.g. from the buffer) in question. If so, the consumer processing unit in an embodiment accordingly reads the new data of the data output (from the buffer) and processes that data accordingly.

Correspondingly, once a consumer processing unit has read new data of a data output in response to a progress update message sent by the synchronization unit (e.g. the new data output partition in question), it in an embodiment then waits for the next progress update message from the synchronization unit for the data output in question, before attempting to read further data for the data output from the memory.

In embodiment, as discussed above, the progress update messages sent by the synchronization unit to the consumer processing unit(s) also indicate (include) a progress indication (e.g. and in an embodiment counter value) that indicates the progress (e.g. position) that has been reached by the producer processing unit for the data output in question, and a (and the) consumer processing unit(s) use the progress indication (e.g. counter value) that is included in a progress update message sent by the synchronization unit to control their reading of data for the data output in question, e.g., and, in an embodiment, to determine whether data that the consumer processing unit is waiting for is available to read for the data output (e.g. from the buffer) in question.

For example, and in an embodiment, a consumer processing unit could, and in an embodiment does, use the progress value included in a progress update message to determine which parts (e.g. scan lines) of a data output have been written (to the buffer), and so are available to read (and process) or not. This may be, and is in an embodiment, also based on the number of synchronization updates (the number of progress update messages) that the producer processing unit will signal to the synchronization unit when producing the data output in question (and thus the amount of the data output that each progress update "count" in effect represents and corresponds to).

For example, considering a data output for which the initial progress (counter) value is n and the number of progress update messages (synchronization points) that the producer processing unit will signal to the synchronization unit when producing that data output is m, then for a data output having a height h (e.g. in terms of the number of scan lines), then to determine that the data output from the first line to line h/m−1 is available, the consumer processing unit will need to wait for the counter number to reach n+1 (i.e. for an update message signalling that the progress value is now n+1), and for any lines of the data output from line h/m to h/m*2−1 to be available, the progress value (counter number) will need to be n+2, and so on.

Thus once the consumer processing unit receives a progress update message with a progress (counter) value, it can, and in an embodiment does, determine from the progress (counter) value in the progress update message sent by the synchronization unit how much of the data output has been produced, and so how much data for that data output it can read, and/or whether data for the data output that it is waiting for is now available for it to read for the data output or not.

In an embodiment the consumer processing unit (hardware) records the progress (counter) value in a progress update message sent by the synchronization unit, and then before it starts reading data for the data output in question, determines if the progress (counter) value in the progress update message is large enough to indicate that the data (e.g. the line of the data output) that the consumer processing unit wishes to read has been produced and stored for the data output.

This can also allow a consumer processing unit that has, e.g., "missed" an update message for any reason, to still be able to determine how much of a data output has been produced.

This operation will then be repeated when the producer processing unit next provides a progress update, and so on, until the producer processing unit has generated the entire data output, and the consumer processing unit has processed that output.

In an embodiment, a producer processing unit that is producing a data output associates with the data output (e.g. with the allocated storage (e.g. buffer) where the data output is to be stored) the producer processing unit data output record entry (slot) identity that the producer processing unit is using for that data output, e.g., and in an embodiment, so that a consumer processing unit can identify the corresponding producer processing unit data output record entry (slot) that the synchronization unit is maintaining for the data output in question. This will then facilitate the identification of the data output record entry (slot) that is associated with the data output being produced by the producer processing unit, e.g., and in an embodiment, so that consumer processing units can identify progress update messages relating to that data output.

Thus, in an embodiment, when a producer processing unit first starts producing a data output (e.g. a frame), it allocates to that data output (e.g. frame) the (or one of the) producer processing unit data output record entry (slot) that has been allocated to the producer processing unit, so as to identify that producer processing unit record entry (slot) as being the entry for the data output in question.

In an embodiment, the producer processing unit provides this information with the allocated memory region (buffer) for the data output, e.g., and in an embodiment, as or as part of, meta-data that is associated with and provided for the data output in question.

A consumer processing unit that is to read a data output is in an embodiment then able to (and in an embodiment does) read the producer processing unit data output record entry (slot) identity associated with the data output (e.g. from meta data associated with the data output), so as to identify the corresponding producer processing unit data output record entry for the data output.

In an embodiment, as well as indicating the producer processing unit data output record entry (slot) that relates to a data output, the producer processing unit also associates with a data output further information that a consumer processing unit may (and in an embodiment does) use to control and synchronize its use of the data output with the operation of the producer processing unit generating the data output.

In an embodiment, a producer processing unit also associates with a data output an indication of the number of progress update messages (synchronization points) that the producer processing unit will signal to the synchronization unit when producing the data output. Thus, for example, if the producer processing unit is going to signal a progress update to the synchronization unit four times during the production of the data output (e.g. will provide a progress update when the data output is 25%, 50%, 75% and 100% complete), then the producer processing unit will associate that number of progress update points with the data output (e.g. buffer) in question, so that a consumer processing unit that is to use that data output can identify that it should receive four progress updates during the production of the data output by the producing processing unit. As discussed above, this may then allow a consumer processing unit to determine what portion of the data output a given synchronization progress (count) value indicates.

In an embodiment, a producer processing unit also associates with the data output that it is to produce the current progress indication (e.g. and in an embodiment counter value) for the producer processing unit data output record entry (slot) that is to be used for that data output (before it starts the data output in question). As discussed above, this will then allow, for example, a consumer processing unit to determine from that value and the number of progress update messages that will be sent by the producer processing unit when producing the data output in question, what part of the data output a given progress indication (counter) value included in a synchronization message from the synchronization unit corresponds to (indicates), and/or when the final progress update message indicating that the data output has been completed by the producer processing unit has been received.

As will be appreciated from the above, in an embodiment, a producer processing unit that is to generate a data output for use by one or more consumer processing units will accordingly first associate with the data output that it is going to produce the identity of the synchronization unit producer processing unit data output progress record entry that will be used to monitor the progress of the producer processing unit when producing the data output, in an embodiment together with information about the progress (synchronization) update rate that the producer processing unit will provide when producing the data output.

Correspondingly, any consumer processing unit that is to use that data output will first read the information associated with the data output (buffer) by the producer processing unit so as to identify the producer processing unit data output record entry in the synchronization unit for that data output (buffer) (and, in an embodiment, the current synchronization update progress value for that data output and/or the number of progress updates that will be provided by the producer processing unit when producing the data output).

The producer processing unit will then begin to produce the data output and write it to the designated storage (buffer). Once the producer processing unit has produced the first portion (fraction) of the data output after which a progress update to be sent, it will then send a progress update message accordingly to the synchronization unit. The synchronization unit will correspondingly broadcast a progress update message to the consumer processing units, with the consumer processing units determining whether that progress update message applies to a data output that they are processing. If so, the consumer processing unit will then read in the first portion (fraction) of the data output (from the buffer) and process that portion of the data output accordingly.

In the meantime, the producer processing unit will continue to produce the data output and write it to the designated storage (buffer). Once the producer processing unit has produced the next portion (fraction) of the data output after which a progress update is to be sent, it will then send another progress update message to the synchronization unit, with the synchronization unit then providing that progress update to the consumer processing units, which will then process the next portion (fraction) of the data output, and so on, until the data output and its processing by the consumer units has been completed.

In this way, the production and consumption of a data output can be synchronized by the synchronization unit, and at a desired level of granularity within the data output (e.g. frame) in question.

Although the technology described herein has been described above with particular reference to the production of a single data output by a producer processing unit and corresponding use of that data output by a consumer processing unit or units, as will be appreciated by those skilled in the art, these operations can, and in an embodiment are performed for each data output that is produced by a producer processing unit for use by other processing units of the data processing system, and, correspondingly, for and in respect of each producer processing unit of the data processing system that may be producing data outputs for use by other, consumer, processing units of the data processing system.

Any one or more or all of the processing units of the technology described herein may be embodied as processing unit circuitry and/or a processing unit circuit, e.g., in the form of one or more fixed-function units (hardware) (processing circuitry/circuits), and/or in the form of programmable processing circuitry (circuit) that can be programmed to perform the desired operation. Equally, any one or more or all of the processing units and processing unit circuitry/circuits of the technology described herein may be provided as a separate circuit element to any one or more of the other processing units or processing unit circuitry/circuits, and/or any one or more or all of the processing units and processing unit circuitry/circuits may be at least partially formed of shared processing circuitry/circuits.

The processing units and/or data processing system described herein in any embodiment may comprise, or may be, or may form part of, a system on chip (SoC).

As well as the particular processing units, the data processing system of the technology described herein can otherwise include any suitable and desired elements, and units, etc, that a data processing system may include. Thus, in an embodiment, the data processing system further includes a host (e.g. central) processor. The host processor may, for example, execute applications that require data processing by the processing units of the system data processing system. The host processor may send appropriate commands and data to the processing units to control them to perform the data processing operations and to generate and/or use a data output or outputs required by applications executing on the host processor. To facilitate this, the host processor may execute a driver or drivers for the processing units and/or may execute a compiler or compilers for compiling programs to be executed by a programmable execution unit(s) of the processing unit(s).

In embodiments, the processing unit(s) or system may comprise, and/or may be in communication with, one or more memories and/or memory devices that store the data described herein, and/or store software for performing the processes described herein. The processing unit(s) or system may comprise, and/or may be in communication with a display for displaying images based on the data outputs.

The technology described herein can be implemented in any suitable system, such as a suitably configured computer or micro-processor based system. In an embodiment, the technology described herein is implemented in a computer and/or micro-processor based system.

The various functions of the technology described herein can be carried out in any desired and suitable manner. For example, the steps and functions of the technology described herein can be implemented in hardware or software, as desired. Thus, for example, unless otherwise indicated, the various circuitry, circuits, functional elements, stages, units, and "means" of the technology described herein may comprise a suitable processor or processors, controller or controllers, functional units, circuitry, circuits, processing logic, microprocessor arrangements, etc., that are operable to perform the various steps or functions, etc., such as appropriately dedicated hardware elements (processing circuitry/circuits) and/or programmable hardware elements (processing circuitry/circuits) that can be programmed to operate in the desired manner.

The various steps or functions, etc., of the technology described herein may be duplicated and/or carried out in parallel on a given processor. Equally, the various processing units, etc., may share processing circuitry/circuits, etc., if desired.

Subject to any hardware necessary to carry out the specific steps or functions, etc., discussed above, the system can otherwise include any one or more or all of the usual functional units, etc., that data processing systems include.

In an embodiment, the various functions of the technology described herein are carried out on a single data processing platform that generates and outputs the data streams (s) in question.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, further embodiments the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus or system comprising a data processor causes in conjunction with said data processor said apparatus or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus in further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described.

The drawings show elements of a data processing apparatus and system that are relevant to embodiments of the technology described herein. As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings.

Figure 4:
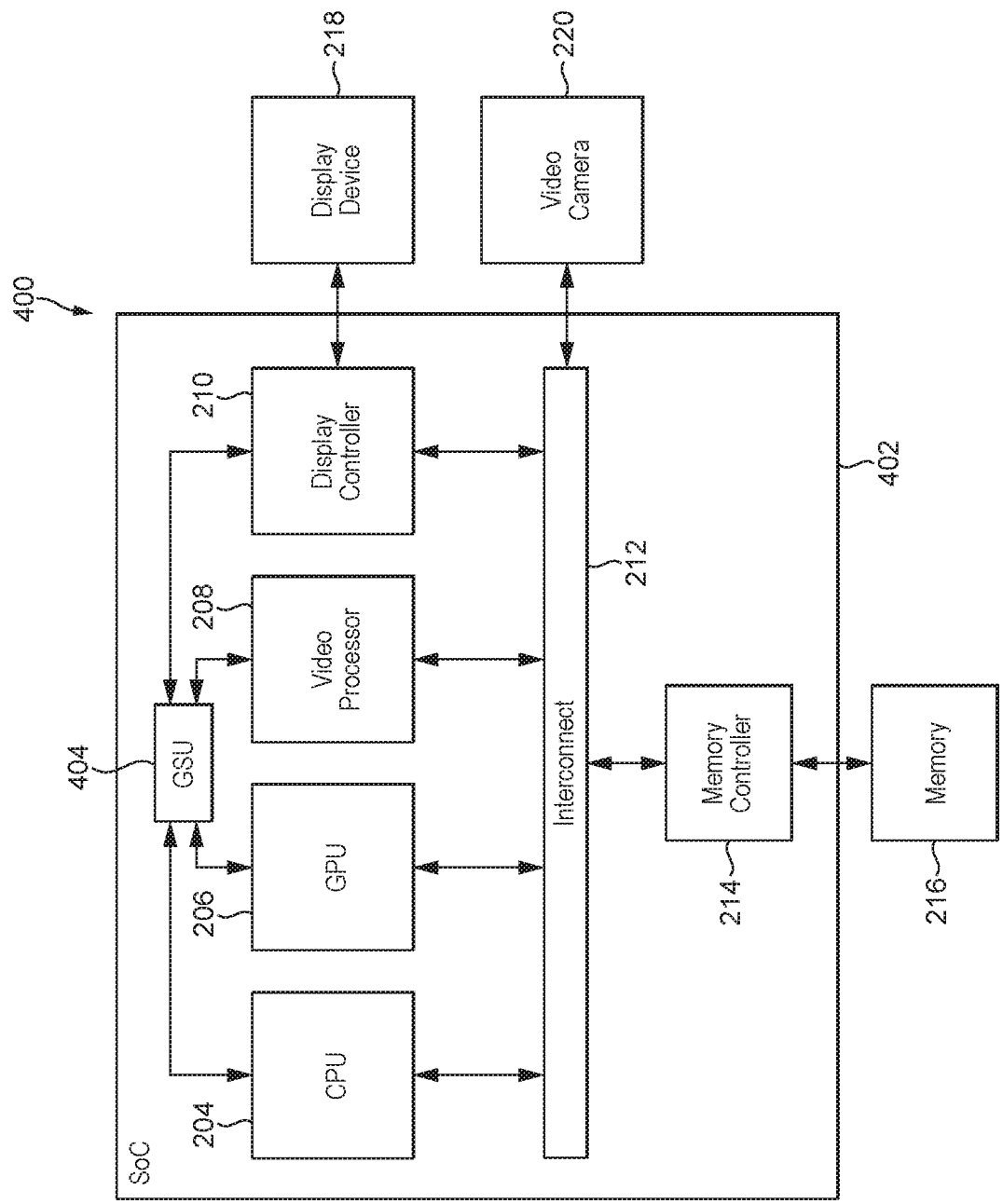
FIG. 4 shows a data processing system of an embodiment of the technology described herein.

FIG. 4 shows an embodiment of a data processing system 400 which includes a multimedia subsystem 402 that is in accordance with the technology described herein. As shown in FIG. 4, the data processing system 400 is similar to the data processing system illustrated in FIG. 1 (and thus accordingly comprises a multimedia subsystem 402 in the form of a system on chip (SoC) that comprises, inter alia, a central processing unit 204, a graphics processing unit 206, a video processor 208, a display controller (processor) 210, an interconnect 212, and a memory controller 214, together with off-chip (main) memory 216, a display device 218 and a video camera 220).

However, unlike the data processing system shown in FIG. 1, the data processing system 400 of this embodiment (and in particular the system-on-chip 402) includes a hardware "general" synchronization unit (GSU) 404 that is able to communicate with the various hardware units of the system-on-chip 402 (as shown in FIG. 4).

As will be discussed further below, the synchronization unit 404 is used to synchronize the operation of the hardware units of the system-on-chip 402, rather than using software "fences" to do that. In particular, the operation of the hardware units is synchronized by signals from the synchronization unit 404, rather than by using software fences.

Figure 5:
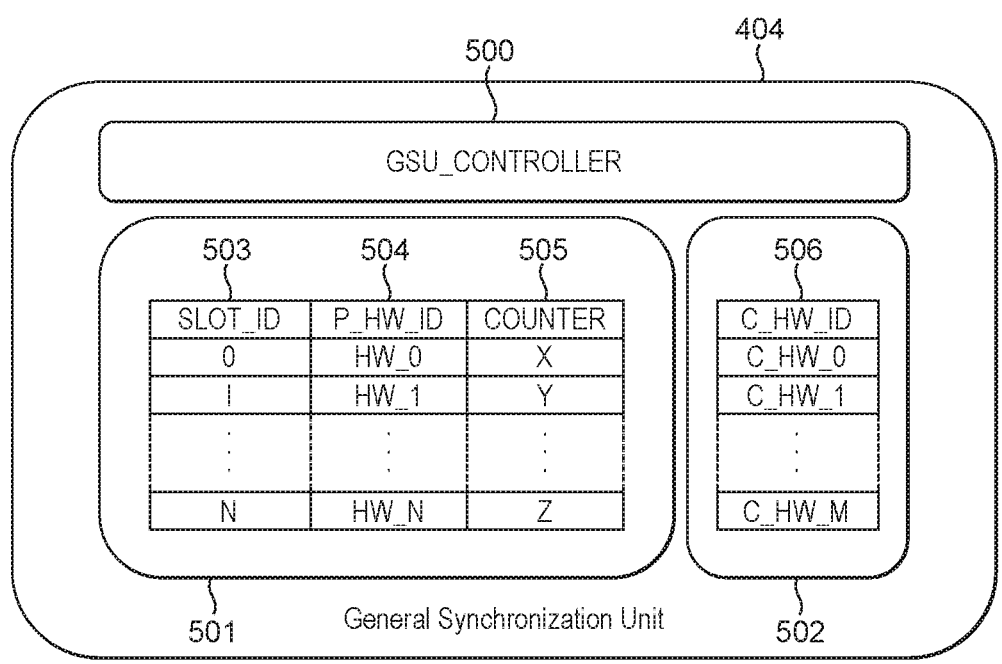
FIG. 5 shows the synchronization unit of the embodiment of FIG. 4 in more detail.

FIG. 5 shows the general synchronization unit (GSU) 404 in more detail.

As shown in FIG. 5, the general synchronization unit 404 includes a controller (control unit) 500, and maintains a record of data outputs that are being generated by producer processing units of the data processing system 501, and a record of consumer processing units of the data processing system 502. Each of the various hardware units, such as the CPU 204, GPU 206, video processor 208 and display processor 210 may be producer and/or consumer processing units.

The controller 500 operates to interact with the other hardware units that are communicating with (and connected to) the synchronization unit 404, and to maintain (e.g. initialise and update) the producer processing unit data output record 501 and the consumer processing unit record 502.

The consumer processing unit record 502 lists consumer processing (hardware) units that have "registered" with the synchronization unit 404, in the form of a list of corresponding consumer hardware unit identities 506.

This consumer processing unit record 502 could, e.g., be hard-coded when the system is built, or initialised by the driver for the synchronization unit at system boot-up (e.g. from an appropriate configuration file), or consumer processing units could also or instead be able to use appropriate driver calls to, e.g., register with the consumer processing unit record.

The producer processing unit data output record 501 comprises a series of data output record entries (slots) 503, each of which has a unique (within the record) entry (slot) identifier. For each entry (slot) in the producer processing unit data output record, the synchronization unit 404 records the identity 504 of the corresponding producer hardware unit that the entry (slot) has been allocated to, and maintains a progress counter value 505 that is indicative of the progress that the producer processing unit has made when producing the data output(s) that the data output record entry (slot) in question relates to.

The progress counter value may, e.g., be a 64-bit integer, and, in the present embodiments, is initialised to 0, and then progressively increased each time the producer processing unit that the entry (slot) has been allocated to sends a progress update message as it produces a data output or outputs. (Thus, the progress counter value is a cumulative count of the number of progress update messages that have been sent for the data output record entry (slot) in question, and is cumulatively incremented by one each time a progress update message for that data output record entry is sent by a producer processing unit.) (This will be discussed in more detail below).

The general synchronization unit (GSU) 404 is driven by a driver (which, e.g., runs in the Linux kernel space), that configures the GSU hardware for initialization and synchronization, and interfaces with drivers of other hardware units so as to allow those other hardware units to interact with and to cooperate with the GSU 404.

The GSU driver is loaded during the system bootup to initialize the GSU hardware, before the GSU 404 is "connected" to other hardware units. When the loading finishes, the GSU hardware is initialized.

As will be discussed further below, the GSU 404 is operable to synchronize all hardware units connected to it. The connected hardware units can be data output "producers" or "consumers". The GSU 404 can operate with any and all hardware units of a multimedia subsystem, such as a GPU, video processor, ISP and display processor.

In the present embodiments, a data output producer processing unit, such as the GPU 206 or video processor 208, that is to produce a data output, will first "connect" to the synchronization unit 404.

To do this, the producer processing unit will request one or more producer processing unit data output record entries (slots) from the synchronization unit 404. This is done by the driver for the producer processing unit signalling the driver for the synchronization unit 404, during initialisation of the producer processing unit.

For example, the driver of the producer processing unit may send a message (a function call) of the form:

*int gsu*_connect(*int hw_id*)

where "hw_id" specifies the identity (e.g. is an integer) for the producer processing unit hardware to be connected to the GSU 404.

In response to a gsu_connect( ) call from the driver of a producer processing unit, the driver for the GSU 404 checks the usage status for each data output record entry (slot) in the producer processing unit data output record 501. If the driver finds a free entry (slot), it sets the producer hardware unit ID 504 for that entry (slot) to the indicated hw_id field in the message from the producer processing unit, and then returns the entry (slot) identifier for the allocated data output record entry (slot) to the driver of the producer processing unit in question.

If the synchronization unit driver does not find a free entry (slot) in the producer processing unit data output record 501, it returns an "unavailable" value, such as −1, to the driver of the producer processing unit in question, to indicate that situation.

(Any hardware unit that wishes to connect to the GSU 404, will call this function to get a slot ID before using the GSU 404 for synchronization.)

In the present embodiments, there are sufficient producer processing unit data output record entries (slots) for each of the producer processing units that it may be expected will connect to the synchronization unit 404, such that the producer processing units retain their entries (slots) in the producer processing unit data output record 501 maintained by the synchronization unit 404 until the system is shut down.

However, it would also or instead be possible to allow a producer processing unit to positively "disconnect" from the synchronization unit 404, if desired. In this case, the driver for the hardware unit that wishes to disconnect could send to the driver for the synchronization unit 404 a message of the form:

*int gsu*_disconnect(*int hw_id*);

where hw_id specifies the hardware ID for the producer processing hardware unit to be removed from the synchronization unit.

In response to such a gsu_disconnect( ) call from the driver of a producer processing unit, the driver for the GSU 404 would check the hardware identifiers associated with each data output record entry (slot) in the producer processing unit data output record 501 to find the entry or entries that match the hardware ID included in the gsu_disconnect( ) message.

If the synchronization unit driver finds an entry or entries having the corresponding hardware ID, then it clears the content of that producer processing unit data output record entry or entries (slot or slots), and returns a data value, such as 0, to the driver for the hardware unit in question to indicate that the "disconnection" has been successful. The cleared producer processing unit data output record entry or entries (slot or slots) are then made available for allocation to another producer processing unit or units.

If the synchronization unit driver does not find a data output record entry (slot) having the hardware ID in question, then it returns an "error" value, such as −1, to the driver of the producer processing unit in question, to indicate that an error has occurred.

Once a producer processing unit, such as the graphics processor 206, has connected to the synchronization unit 404 in the manner discussed above, then that producer processing unit can start to produce data outputs, with the production and consumption of the data outputs then being synchronized by the synchronization unit 404.

When a producer processing unit is to generate a data output, the driver for that producer processing unit will first determine the synchronization strategy to be used for the data output in question, in terms of the number of progress update messages that the producer processing unit will send to the synchronization unit 404 whilst producing the data output. For example, the producer processing unit driver may determine that the producer processing unit should send four progress update messages to the synchronization unit 404 when producing the data output (in which case the producer processing unit will send a progress update message after it has completed 25%, 50%, 75% and 100% of the data output in question).

The producer processing unit also maintains a progress counter for a (and for each) synchronization unit data output record 501 entry (slot) that it has been allocated. This progress counter is initialised to 0 when the producer processing unit first connects to the synchronization unit 404, and is then incremented by one each time the producer processing unit sends a progress update message to the synchronization unit 404 for the producer processing unit data output record entry in question.

The driver for the producer processing unit then associates with the buffer where the data output in question is going to be stored, a set of "synchronization data", comprising: the identity of the producer processing unit data output record entry (slot) that is being used by the synchronization unit to track the progress of the generation of the data output in question; the determined synchronization strategy (in terms of the number of progress update messages that will be provided) when producing the data output in question; and the current progress counter value for the producer processing unit data output record entry (slot) in question (as discussed above, the progress counter value for a producer processing unit data output record 501 entry is a cumulative count of the number of progress update messages that have been sent for the data output record entry (slot) in question).

(Thus, for example, if the size of a data output buffer to be produced is 160 scan lines, and the determined synchronization strategy is to provide ten progress update messages when producing that data output, then the producer processing unit will send a progress update message to the synchronization unit 404 every 16 scan lines and if the original synchronization point value (count) at the start of the data output in question was 6, the end synchronization point value (count) would be 16.)

A consumer processing unit that is to use the data output being produced by the producer processing unit will then read the synchronization data associated with the buffer that is to contain the data output so that it knows how to synchronize with the production of the data output by the producer processing unit.

In particular, a (and each) consumer processing unit that is to use the data output will determine from the synchronization data, the identity of the producer processing unit data output record entry (slot) that is being used to track the progress of the generation of the data output in question, and also determine from the indicated synchronization strategy and current progress counter value for the data output in question, how many progress (synchronization) messages it should receive as the data output is being produced, and what portion of the data output each progress (synchronization) message (and progress count) represents and corresponds to (so that it can synchronize its consumption of the data output with the production of the data output by the producer processing unit).

The producer processing unit can then start to produce the data output in question, and as it does so, it will send progress update messages to the synchronization unit 404 in accordance with the determined synchronization strategy for the data output. Thus, for example in the example discussed above, where there will be four progress update messages whilst producing a data output, the producer processing unit will send a progress update message to the synchronization unit 404 when it has completed 25% of the data output, and then when it has completed 50% of the data output, and so on.

In the present embodiments, the progress update messages that are sent by a producer processing unit when producing a data output are of the form:

{producer_hw_id,slot_id,counter_value}.

where: producer_hw_id is the hardware ID for the producer processing unit in question; slot_id is the identity of the producer processing unit data output record entry (slot) that is being used to track the progress of the generation of the data output in question; and counter_value is the (producer processing unit's) new (updated) progress counter_value for the producer processing unit data output record entry (slot) in question.

When the synchronization unit 404 receives a progress update message from a producer processing unit, it first checks the producer hardware identity in the progress update message against the producer hardware identity recorded for the indicated data output record entry (slot). If the producer processing unit hardware identity matches, then the progress counter_value for that data output record entry is updated (incremented) to the value in the message from the producer processing unit. If the producer hardware identities do not match, then the synchronization unit 404 returns an error message to the producer hardware unit in question.

As discussed above, the progress update (synchronization) messages are exchanged through hardware communication between the producer hardware and the synchronization unit, without any software involvement.

When a progress update message from a producer processing unit is determined to be valid, then the synchronization unit 404 broadcasts to all of the consumer processing units in the consumer processing unit record 502, a progress update (synchronization) message of the form:

{slot_id,counter_value}.

where: slot_id is the identity of the producer processing unit data output record entry (slot) that the message relates to; and counter_value is the new (updated) progress counter_value for the producer processing unit data output record entry (slot) in question. Again, this progress update (synchronization) message is broadcast and received through hardware communication between the consumer hardware and the synchronization unit, without any software involvement.

In response to such a broadcast message, each consumer processing unit checks if it is a message for a data output record entry (slot) that the consumer processing unit is waiting for (based on the slot_id included in the progress update message broadcast by the synchronization unit 404), and if so, accordingly determines that more data is available for the data output that it is processing.

More particularly, the consumer processing unit in the present embodiments uses the counter_value (i.e. the new (updated) progress counter_value for the data output) included in the progress update (synchronization) message sent by the synchronization unit 404 to determine what portion (how much) of the data output in question has now been written to the buffer by the producer processing unit (based on the indicated number of synchronization updates (the number of progress update messages) that the producer processing unit will signal to the synchronization unit when producing the data output in question, and the indicated initial progress counter_value for the data output in question).

The consumer processing unit (hardware) records the progress (counter) value in the progress update message sent by the synchronization unit, and then before it starts reading data for the data output in question, determines if the progress (counter) value in the progress update message is large enough to indicate that the data (e.g. the line of the data output) that the consumer processing unit wishes to read has been produced and stored for the data output.

If the consumer processing unit determines from the progress counter_value included in the progress update message broadcast by the synchronization unit 404 that data that it is waiting for for the data output is now available in the buffer, the consumer processing unit determines that it can, and accordingly does, then operate to, read the required further data from the buffer and process it accordingly. The consumer processing unit will then wait for the next progress update message, and so on.

If the progress update message broadcast by the synchronization unit 404 is not for a data output record entry that a consumer processing unit is waiting for, then the consumer processing unit simply ignores the progress update message.

This operation is repeated until the data output in question has been completely produced and consumed, and is correspondingly carried out and repeated for any and all data outputs that are being produced and consumed in the data processing system.

Figure 6:
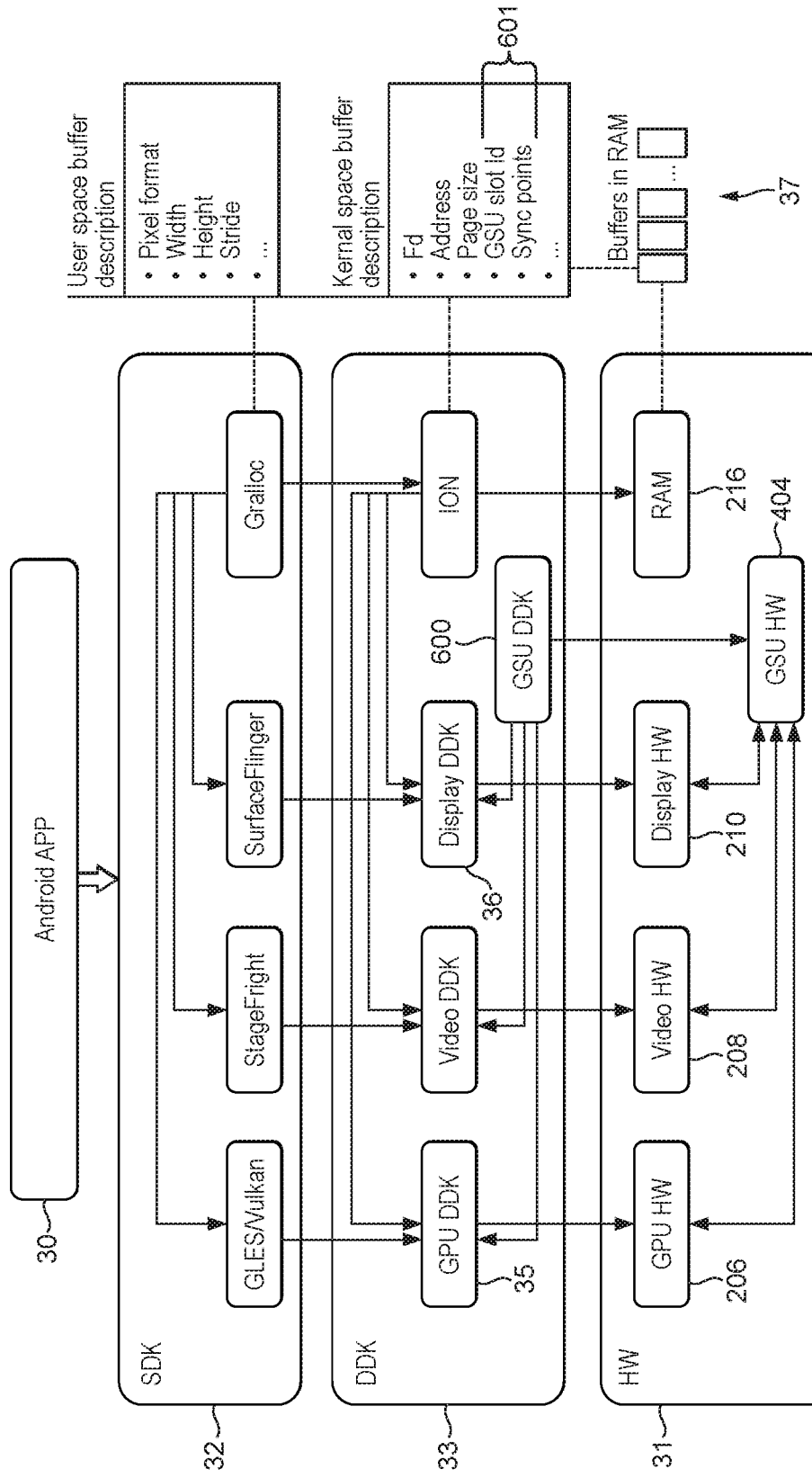
FIGS. 6 and 7 show schematically synchronization of producer and consumer processing unit operation in the embodiment of FIGS. 4 and 5.
Figure 7:
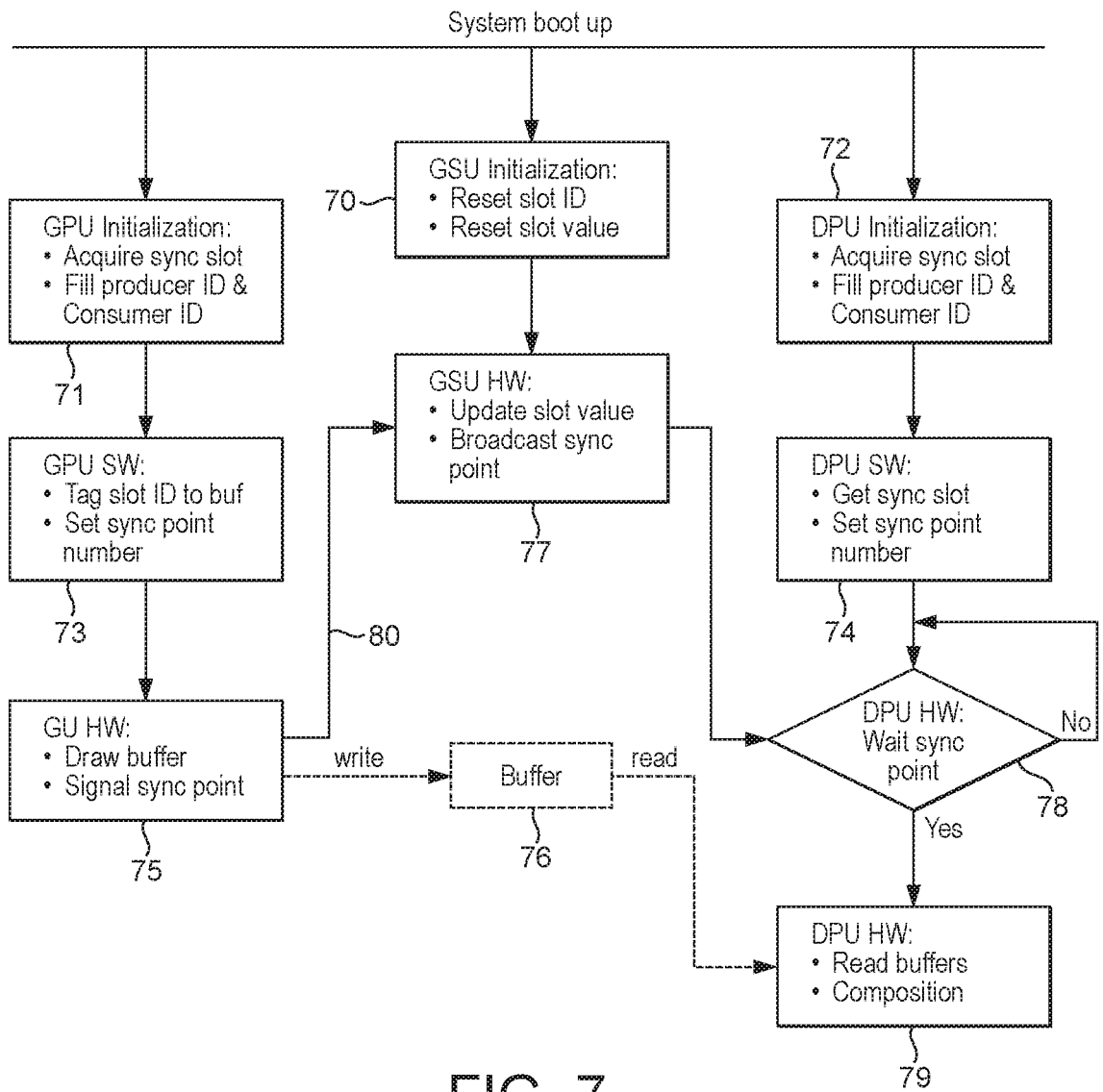

FIGS. 6 and 7 illustrate the above operation when using the synchronization unit 404 to synchronize the operation between a producer processing unit that is producing a data output and a consumer processing unit that is using that data output in embodiments of the technology described herein.

Figure 2:
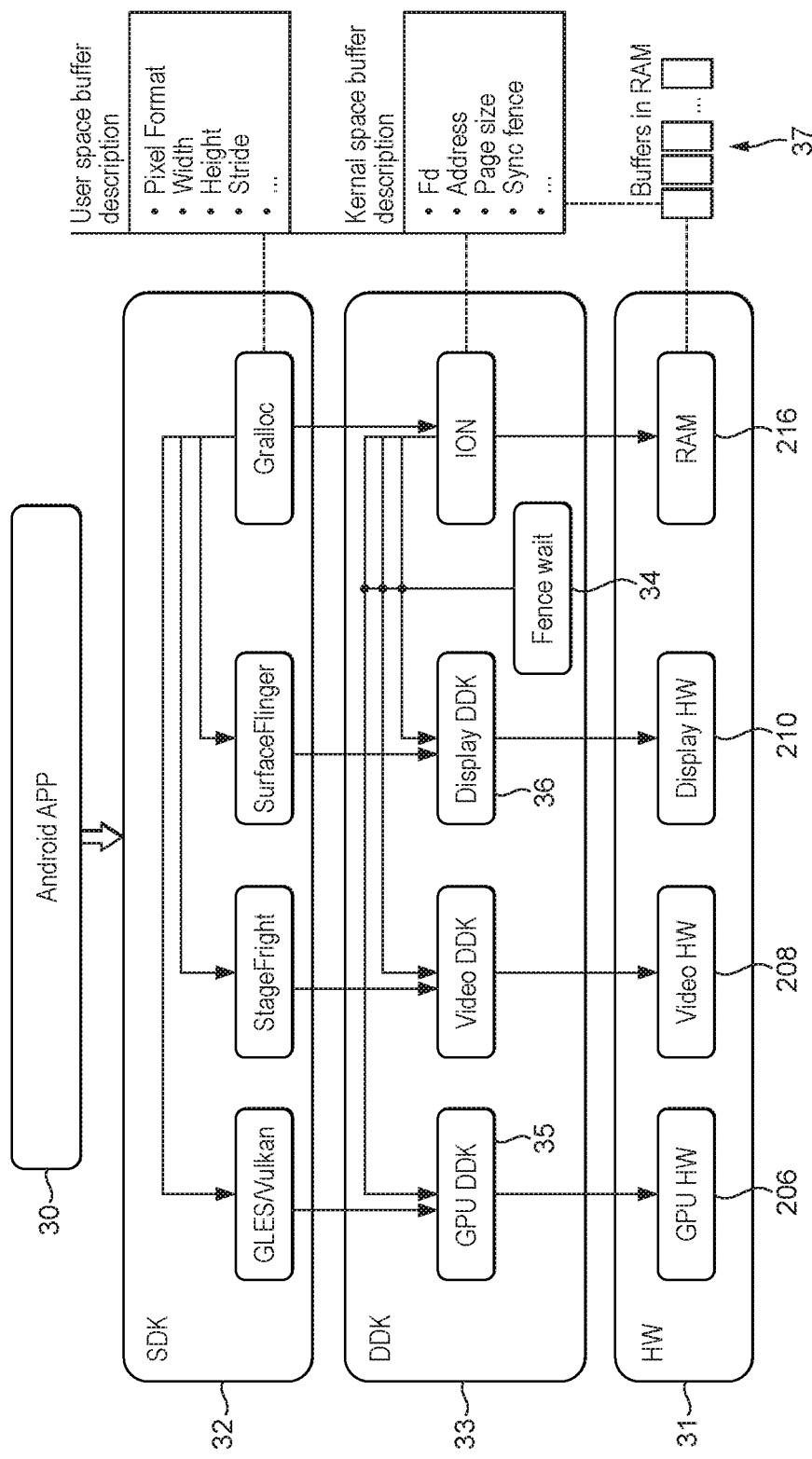
FIGS. 2 and 3 show schematically the synchronization of producer and consumer processing unit operation in the data processing system of FIG. 1.
Figure 3:
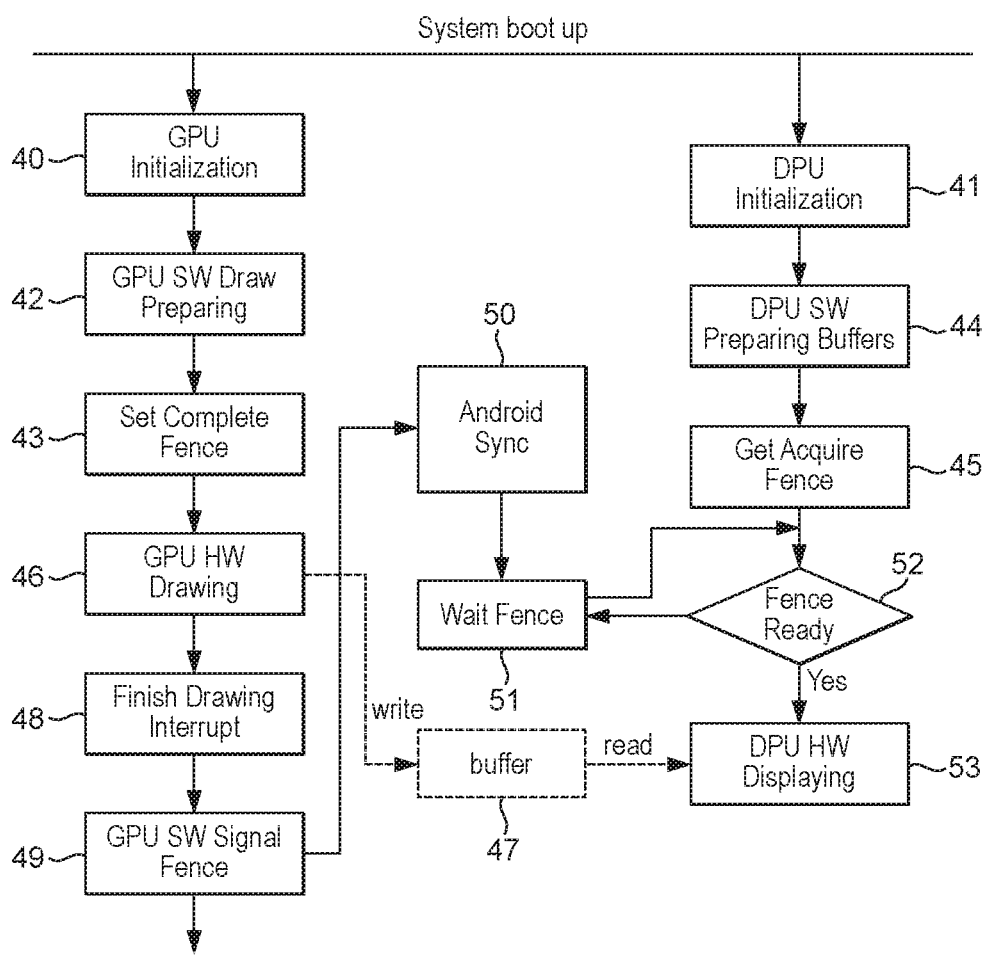

FIG. 6 shows an exemplary multimedia subsystem stack that is similar to the stack shown in FIG. 2, but as shown in FIG. 6, rather than using a software fence to synchronize operation between the producer and consumer processing units, the communication and control of the hardware processing units 31 is synchronized by means of a general synchronization hardware unit 404 under the control of its respective synchronization unit driver 600.

FIG. 7 shows schematically the synchronization operation using the general synchronization unit 404 in the present embodiments in the case where the graphics processing unit 206 is generating a data output such as a frame, which the display processor 210 will then compose and provide to the display device 218 for display.

As shown in FIG. 7, this operation will first comprise, at system boot-up, initialisation of the general synchronization unit hardware 404 (step 70). As part of this operation, the synchronization unit driver 600 will reset each producer processing unit data output record entry (slot) in the record of producer processing unit data outputs 501 that it is maintaining. It will also reset the list of consumer processing units 502.

Thereafter, the driver 35 for the graphics processor 206 will exchange messages with the driver 600 for the synchronization unit 404 so as to "connect" to the synchronization unit 404 (step 71) (as discussed above). As shown in FIG. 7, and as discussed above, during this process, the graphics processor 206 will be allocated an entry (slot) in the record 501 of data outputs that is being maintained by the synchronization unit 404, and, correspondingly, the controller 500 of the synchronization unit 404 will record the producer hardware identity for the graphics processor 206 against the data output record (slot) that has been allocated to the graphics processor 206.

As shown in FIG. 7, it is assumed in this embodiment that the graphics processor 206 also registers with the synchronization unit 404 as a consumer processing unit, and so the driver 600 for the synchronization unit 404 correspondingly adds the graphics processor's consumer processing unit identity to the list of consumer processing units 502 that it is maintaining.

A corresponding registration process then takes place for the display processor 210 (step 72). As shown in FIG. 7, it is again assumed here that the display processor 210 registers both as a producer and as a consumer with the synchronization unit 404.

Once the graphics processor 206 has been initialised and connected to the synchronization unit 404, the driver 35 for the graphics processor 206 determines the synchronization strategy (the number of update messages) to be used for the data output (e.g. frame for display) that it is generating.

The driver 35 for the graphics processor 206 will then prepare an appropriate buffer or buffers 37 for storing the data output (e.g. frame to be displayed) that it is going to generate. This will include adding 601 the identity of the synchronization unit data output record entry (slot) for the data output and the number of progress update messages that will be sent when producing the data output to the buffer description (meta data) (see FIG. 6). (Step 73.)

The display processor driver 36 then correspondingly determines from this meta-data that the graphics processor driver 35 has associated with the buffer where the data output (frame) is going to be stored, the identity of the data output record entry (slot) that is being used for the data output (buffer) in question, and the synchronization strategy that the graphics processor will use for the data output in question (step 74).

The graphics processor hardware 206 can then start to draw the frame and write the frame into the appropriate buffer 76 in memory (step 75). As shown in FIG. 7, as part of this process, the graphics processor hardware will send a progress update message 80 periodically to the synchronization unit 404, as it reaches each synchronization update point during generation of the data output (frame) in question (as determined by the synchronization strategy that has been determined for the frame).

In response to each progress synchronization update message 80 from the graphics processor hardware 206, the synchronization unit 404 will update the progress count 505 for the data output entry (slot) in question, and broadcast a corresponding progress synchronization message to the consumer processing units (as discussed above) (step 77).

The display processor hardware 210 will correspondingly receive the broadcast synchronization update message from the synchronization unit 404, and identify that it is a synchronization progress update message that relates to a buffer that it is waiting on, and in response to that, read the new data from the buffer and, e.g., perform composition using that data and provide the data to the display for display (steps 78 and 79).

The display processor 210 will then wait for the next synchronization update message from the synchronization unit 404, before processing the next portion of the data output (frame), and so on.

In this way, the synchronization unit 404 operates to synchronize the operation between the graphics processor 206 that is producing the frame or frames for display, and the display processor 210 that is processing and then displaying those frames, and in such a way that the operation can be synchronized during the production of a given frame (rather than, e.g., only once the frame has been completed by the graphics processor 206).

The present embodiments can be used for synchronization of any suitable and desired operations in the multimedia subsystem 402.

An example of such operation would be for augmented reality display, where the camera 220 captures images and send them to the GPU 206 for processing, which then sends the processed images to the display processor 210 for composition and presentation.

When using the general synchronization unit 404, the driver for the GPU 206 could, e.g., set 10 synchronization points for each image. In this case, the latency between the camera 220 and the GPU 206 would be 10% of a frame, and the latency between the GPU 206 and the display processor 210 would also be 10% of a frame. Therefore, the total latency is 20% of a frame. (This contrasts with more conventional synchronization, where the GPU 206 only starts processing the buffer for the images after an image is completely stored in the memory 216, and the display processor 210 only starts processing the processed image in the buffer after the GPU 206 finishes its processing, such that the total latency is at least 2 frames.)

As will be appreciated from the above, the technology described herein, in its embodiments at least, provides a synchronization arrangement that can reduce the latency between respective producer and consumer hardware units in a data processing system. This is achieved, in the embodiments of the technology described herein at least, by using a general synchronization hardware unit to synchronize the operation of the producer and consumer processing units when producing and consuming a data output, rather than software fences. By using a hardware synchronization unit to synchronize the operation between producer and consumer units, the latency between producer and consumer hardware units can be reduced, e.g., from one frame to one or several scan lines.

The foregoing detailed description has been presented for the purposes of illustration and description. It is not intended to be exhaustive or to limit the technology to the precise form disclosed. Many modifications and variations are possible in light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A data processing system comprising:
one or more producer processing units operable to produce data outputs;
one or more consumer processing units operable to use a data output produced by a producer processing unit; and
a memory for storing data outputs produced by the producer processing unit or units;
wherein:
the one or more producer processing units each comprise processing circuitry operable to produce a data output and store the data output in the memory; and
the one or more consumer processing units each comprise processing circuitry operable to read a data output from the memory and use the read data output;

the data processing system further comprising:
a synchronization unit that is operable to communicate with the one or more producer processing units and the one or more consumer processing units, and that is operable to:
maintain a record of data outputs that are being generated by producer processing units of the data processing system;
receive from a producer processing unit of the data processing system a message relating to the progress that the producer processing unit has made when producing a data output; and
and to, in response to the message relating to the progress that the producer processing unit has made when producing the data output received from the producer processing unit:
send to one or more consumer processing units of the data processing system a message relating to the progress that the producer processing unit has made when producing the data output;
wherein:
the one or more producer processing units each further comprise processing circuitry operable to send to the synchronization unit messages relating to the progress that the producer processing unit has made when producing a data output; and
the one or more consumer processing units each further comprise processing circuitry operable to:
receive data output progress messages from the synchronization unit and to control the reading of a data output from the memory in accordance with data output progress messages received from the synchronization unit.

2. The system of claim 1, wherein the record of data outputs that are being generated by producer processing units of the data processing system that is maintained by the synchronization unit comprises a set of plural record entries, with each entry having a respective entry identifier, and having associated with it an identifier for the producer processing unit that the entry has been allocated to.

3. The system of claim 2, wherein each entry in the record of data outputs also has associated with it a progress indication that is indicative of the progress that the producer processing unit that the data output record entry has been allocated to has made when producing a data output or outputs.

4. The system of claim 3, wherein the progress indication is in the form of a count of a number of progress update messages that the producer processing unit that the data output record entry has been allocated to has sent to the synchronization unit.

5. The system of claim 1, wherein the synchronization unit is also operable to maintain a record of consumer processing units of the data processing system.

6. The system of claim 1, wherein the producer processing units and the consumer processing units of the data processing system are operable to register with the synchronization unit before their operation is synchronized using the synchronization unit.

7. The system of claim 1, wherein the progress messages sent by the producer processing units include at least one of: an indication of the identity of the producer processing unit in question; an indication of the identity of the producer processing unit data output record entry for the data output that the progress message relates to; and an indication of the progress that the producer processing unit has made when producing the data output that the progress message relates to.

8. The system of claim 1, wherein the producer processing units are operable to send plural progress messages to the synchronization unit while producing a data output.

9. The system of claim 8, wherein the number of progress messages to be provided for a data output is determined and set by a driver for the producer processing unit that is producing the data output.

10. The system of claim 1, wherein the synchronization unit is operable to, when it receives a progress message from a producer processing unit, broadcast to plural consumer processing units, a message relating to the progress that the producer processing unit has made when producing the data output that indicates the data output that the message relates to.

11. The system of claim 1, wherein:
the producer processing units are operable to associate with a data output that they are producing, the identity of the producer processing unit data output record for the data output;
and
the consumer processing units are operable to read the identity of a producer processing unit data output record associated with a data output to identify the producer processing unit data output record that the synchronization unit is maintaining for the data output.

12. A method of operating a data processing system that comprises:
one or more producer processing units operable to produce data outputs;
one or more consumer processing units operable to use a data output produced by a producer processing unit;
a memory for storing data outputs produced by the producer processing unit or units; and
a synchronization unit that is operable to communicate with the one or more producer processing units and the one or more consumer processing units;
the method comprising:
a producer processing unit of the one or more producer processing units producing a data output and storing the data output in the memory; and
one or more of the one or more consumer processing units reading the data output from the memory and using the read data output;
the method further comprising:
the synchronization unit maintaining a record of the data output that is being generated by the producer processing unit;
the producer processing unit that is producing the data output sending to the synchronization unit a message relating to the progress that the producer processing unit has made when producing the data output;
the synchronization unit receiving from the producer processing unit the message relating to the progress that the producer processing unit has made when producing the data output, and, in response to the message relating to the progress that the producer processing unit has made when producing the data output from the producer processing unit, the synchronization unit sending to one or more consumer processing units of the data processing system, a message relating to the progress that the producer processing unit has made when producing the data output;
and
one or more of the consumer processing units receiving the data output progress message from the synchronization unit and controlling their reading of the data output from the memory in accordance with the data output progress message received from the synchronization unit.

13. The method of claim 12, wherein the record of data outputs that are being generated by producer processing units of the data processing system that is maintained by the synchronization unit comprises a set of plural record entries, with each entry having a respective entry identifier, and having associated with it an identifier for the producer processing unit that the entry has been allocated to.

14. The method of claim 13, wherein each entry in the record of data outputs also has associated with it a progress indication that is indicative of the progress that the producer processing unit that the data output record entry has been allocated to has made when producing a data output or outputs.

15. The method of claim 14, wherein the progress indication is in the form of a count of a number of progress update messages that the producer processing unit that the data output record entry has been allocated to has sent to the synchronization unit.

16. The method of claim 12, wherein the synchronization unit also maintains a record of consumer processing units of the data processing system.

17. The method of claim 12, further comprising:
a producer processing unit first requesting from the synchronization unit an allocation of an entry or entries in the producer processing unit data output record that is maintained by the synchronization unit; and
the synchronization unit, in response to such a request, allocating an entry or entries in the producer processing unit data output record maintained by the synchronization unit to the requesting producer processing unit.

18. The method of claim 12, wherein the progress messages sent by the producer processing units include at least one of: an indication of the identity of the producer processing unit in question; an indication of the identity of the producer processing unit data output record entry for the data output that the progress message relates to; and an indication of the progress that the producer processing unit has made when producing the data output that the progress message relates to.

19. The method of claim 12, comprising the producer processing unit sending a plurality of progress messages to the synchronization unit at intervals when generating the data output.

20. The method of claim 19, comprising a driver for the producer processing unit that is producing the data output determining and setting the number of progress messages to be sent for the data output.

21. The method of claim 12, comprising:
the synchronization unit, when it receives a progress message from the producer processing unit, broadcasting to plural consumer processing units, a message relating to the progress that the producer processing unit has made when producing the data output, that indicates the data output that the progress message relates to.

22. The method of claim 12, comprising:
the producer processing unit associating with the data output that it is producing, the identity of the producer processing unit data output record for the data output; and
one or more of the consumer processing units reading the identity of the producer processing unit data output record associated with the data output to identify the producer processing unit data output record that the synchronization unit is maintaining for the data output.

23. A computer readable storage medium storing computer software code which when executing on a processor performs a method of operating a data processing system that comprises:
one or more producer processing units operable to produce data outputs;
one or more consumer processing units operable to use a data output produced by a producer processing unit;
a memory for storing data outputs produced by the producer processing unit or units; and
a synchronization unit that is operable to communicate with the one or more producer processing units and the one or more consumer processing units;
the method comprising:
a producer processing unit of the one or more producer processing units producing a data output and storing the data output in the memory; and
one or more of the one or more consumer processing units reading the data output from the memory and using the read data output;
the method further comprising:
the synchronization unit maintaining a record of the data output that is being generated by the producer processing unit;
the producer processing unit that is producing the data output sending to the synchronization unit a message relating to the progress that the producer processing unit has made when producing the data output;
the synchronization unit receiving from the producer processing unit the message relating to the progress that the producer processing unit has made when producing the data output, and, in response to the message relating to the progress that the producer processing unit has made when producing the data output from the producer processing unit, the synchronization unit sending to one or more consumer processing units of the data processing system, a message relating to the progress that the producer processing unit has made when producing the data output;
and
one or more of the consumer processing units receiving the data output progress message from the synchronization unit and controlling their reading of the data output from the memory in accordance with the data output progress message received from the synchronization unit.

* * * * *

UNITED STATES PATENT AND TRADEMARK OFFICE
CERTIFICATE OF CORRECTION

PATENT NO. : 10,705,886 B2
APPLICATION NO. : 16/033985
DATED : July 7, 2020
INVENTOR(S) : P. Xuefeng et al.

Page 1 of 1

It is certified that error appears in the above-identified patent and that said Letters Patent is hereby corrected as shown below:

In the Claims

Column 31, Line 12 (Claim 1), please change "output; and" to -- output; --.

Signed and Sealed this
Twenty-second Day of September, 2020

Andrei Iancu
*Director of the United States Patent and Trademark Office*